United States Patent [19]
Buser et al.

[11] 4,085,246

[45] Apr. 18, 1978

[54] SIMULATED GRANITE AND ITS PREPARATION

[75] Inventors: Kenneth Rene Buser; Milton John Roedel, both of Wilmington; Eustathios Vassiliou, Newark, all of Del.

[73] Assignee: E. I. Du Pont de Nemours and Company, Wilmington, Del.

[21] Appl. No.: 588,008

[22] Filed: Jun. 18, 1975

[51] Int. Cl.² .......................... C08K 3/00; C08K 5/00
[52] U.S. Cl. .................. 428/220; 106/93; 260/6; 260/9; 260/17.4 R; 260/22 CB; 260/37 R; 260/37 EP; 260/37 M; 260/37 N; 260/37 P; 260/37 PC; 260/38; 260/39 R; 260/39 P; 260/39 M; 260/39 SB; 260/40 R; 260/42.17; 260/42.18; 260/42.21; 260/42.22; 260/42.24; 260/42.25; 260/42.28; 260/42.29; 260/42.43; 260/42.46; 260/42.47; 260/42.48; 260/42.49; 260/42.52; 428/15
[58] Field of Search ............... 260/42.52, 9, 17.4 R, 260/6, 22 CB, 37 R, 37 EP, 37 M, 37 N, 37 PC, 38, 39 R, 39 P, 39 M, 39 SB, 40 R, 42.18, 42.17, 42.21, 42.22, 42.24, 42.25, 42.28, 42.29, 42.43, 42.46, 42.47, 42.48, 42.49, 42.52; 106/193; 428/220, 15

[56] References Cited

U.S. PATENT DOCUMENTS

| | | | |
|---|---|---|---|
| 3,396,067 | 8/1968 | Schafer | 428/15 |
| 3,663,493 | 5/1972 | Miller | 260/30.6 R |
| 3,827,933 | 8/1974 | Duggins et al. | 260/42.52 |
| 3,847,865 | 11/1974 | Duggins et al. | 260/42.52 |

*Primary Examiner*—James H. Derrington

[57] ABSTRACT

A simulated granite and its preparation are provided. The granite comprises (A) about 35 to 95% by volume of a matrix consisting essentially of (1) at least 34% by volume of polymer, preferably predominantly an acrylic polymer, having a refractive index ($n_D$) between 1.4 and 1.65 and (2) about 1 to 50% by volume of at least one microscopic filler having an amorphous or mean crystalline axial refractive index between 1.4 and 1.65, (B) about 0.1 to 50% by volume of macroscopic opaque particles having an optical density to visible light greater than 2.0 and (C) about 0.1 to 50% by volume of macroscopic translucent and/or transparent particles having an optical density to visible light less than 2.0; in such a ratio of (A) to (B) to (C) that the optical density to visible light of a 0.05 inch thick wafer of the total composite is less than 3.0.

The granite is prepared by making from the described ingredients a castable composition which has a kinematic viscosity no greater than 1000 stokes and a particle setting rate slow enough that it can be controllably cast onto a smooth surface or poured into a mold and cured giving a flat or shaped article with a reproducible simulated granite pattern.

39 Claims, 2 Drawing Figures

SIMULATED GRANITE AND ITS PREPARATION

BACKGROUND OF THE INVENTION

1. Field of Invention

This invention relates to simulated granites and their preparation and more particularly to such granites prepared from acrylic polymers and particular combinations of small and large particles of specified distribution, shape and optical properties.

2. Prior Art

Polished slabs of natural granite have long been used as a standard for decorative, functional, long-lasting construction materials. This is especially true in some end-uses such as wainscoting in commercial buildings. However, the price of polished natural granite is so high that it is effectively barred from many uses. Natural granite is also dense and brittle. For many uses the slabs must be 2 inches thick or greater. This makes the product very heavy and difficult to transport and install. Thus, there is a need for a decorative, simulated granite of lighter weight, easier handling, easier transportation, controllable aesthetics and lower material and installation costs.

The prior art describes many filled polymer compositions useful as floor tiles, bathroom vanity tops and bowls, and other construction applications. For example, U.S. Pat. No. Re. 27,093, issued Mar. 23, 1971, to D. H. Slocum and U.S. Pat. No. 3,847,865, issued Nov. 12, 1974, to Ray B. Duggins describe simulated marble articles. U.S. Pat. No. 3,324,074, issued June 6, 1967, to Robert J. McManimie and U.S. Pat. No. 3,663,493, issued May 16, 1972, to R. E. Miller describe acrylic polymers filled with inorganic particulate matter useful to prepare molded and castable articles such as table tops.

SUMMARY OF THE INVENTION

According to the present invention there is provided a simulated granite article comprising:

(A) about 35 to 95% by volume (based on total granite volume) of a matrix comprising:

(1) at least 34% by volume (based on total granite volume) of polymer having a refractive index ($n_D$) according to ASTM-(D542)27 between 1.4 and 1.65 when cured and (2) about 1 to 50% by volume (based on total granite volume) of filler having a maximum particle size less than about 100 microns in longest dimension and an amorphous or mean crystalline axial refractive index ($n_D$) between 1.4 and 1.65, in such a ratio of (1) to (2) that the optical density to visible light of a 0.01 inch thick film of the matrix is less than 1.5;

(B) about 0.1 to 50% by volume (based on total granite volume) of randomly distributed opaque particles having a minimum particle size greater than 200 microns in shortest dimension and an optical density to visible light greater than 2.0; and (C) about 0.1 to 50% by volume (based on total granite volume) of randomly distributed translucent particles, transparent particles or both having a minimum particle size greater than 200 microns in shortest dimension and an optical density to visible light less than 2.0, in such a ratio of (A) to (B) to (C) that the optical density to visible light of a 0.05 inch thick wafer of the total composite is less than 3.0. Preferably, the surface has a granite-like pattern comprising about 0.1 – 40% area detectable at densitometric level 820, about 0 – 30% additional area detectable at level 860, about 0.1 – 25% additional area detectable at level 900, about 0 – 25% additional area detectable at level 950 and about 15 – 95% additional area detectable at a level about 950 as determined by IMANCO ® Quantimet 720 image analysis.

There is also provided a castable composition for preparing the above-described simulated granite article in which the materials described therein form a polymerizable composition having a kinematic viscosity no greater than 1000 stokes as measured on a Gardner-Holdt bubble viscometer, direct method, ASTM D-1545 and an initial settling velocity of the largest and heaviest particle in the composition of less than about 100 cm./min.

Also provided is a process for preparing the simulated garanite article wherein the castable composition is introduced, such as by pouring onto a casting surface or into a shaped mold, and then cured, preferably to a point where all volatile constituents are reduced to less than 1% by weight of the simulated granite article.

DETAILED DESCRIPTION OF THE INVENTION

Figure 1:
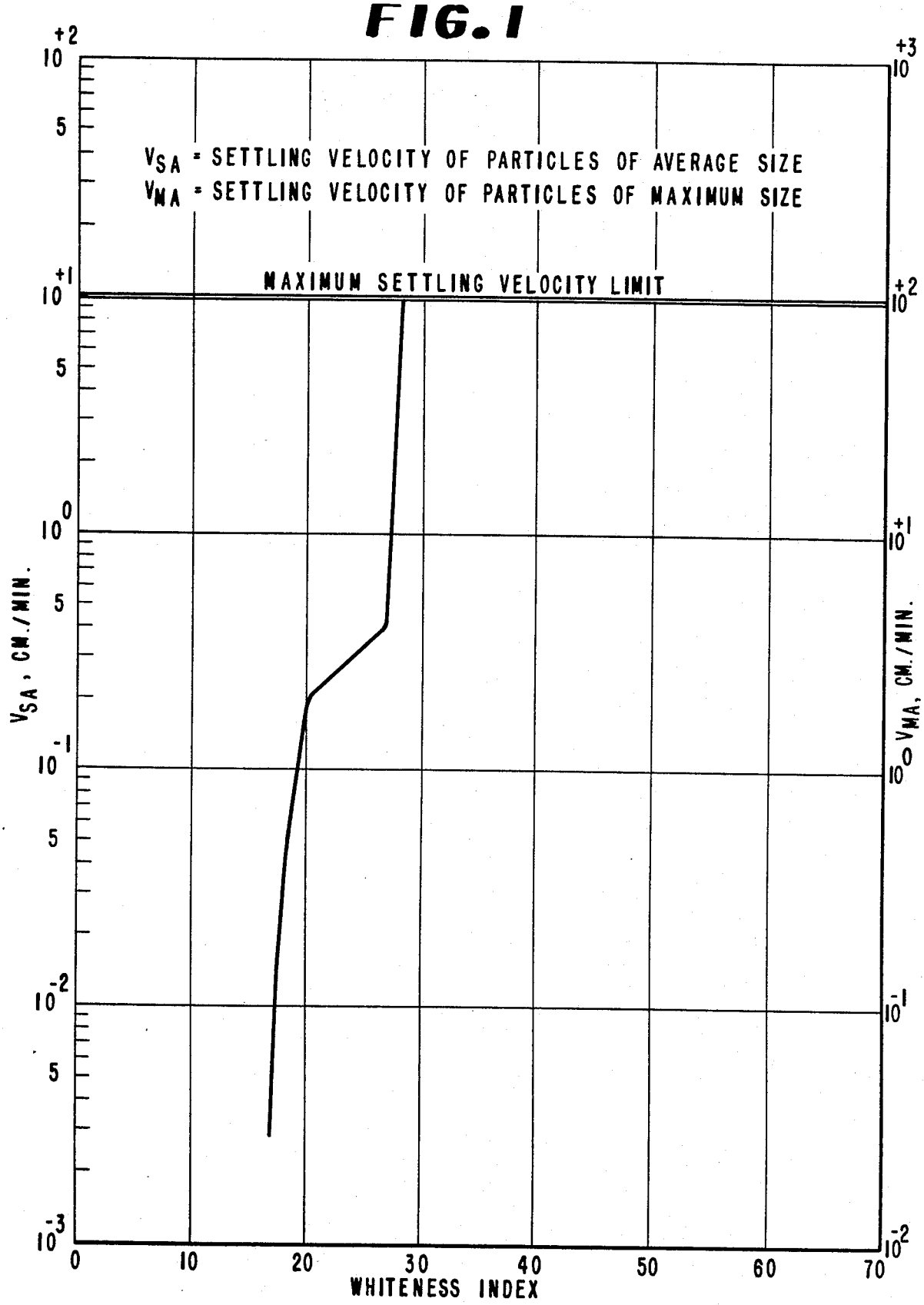
FIG. 1 is a graph showing the effect of particle settling rate on whiteness of the simulated granite.
Figure 2:
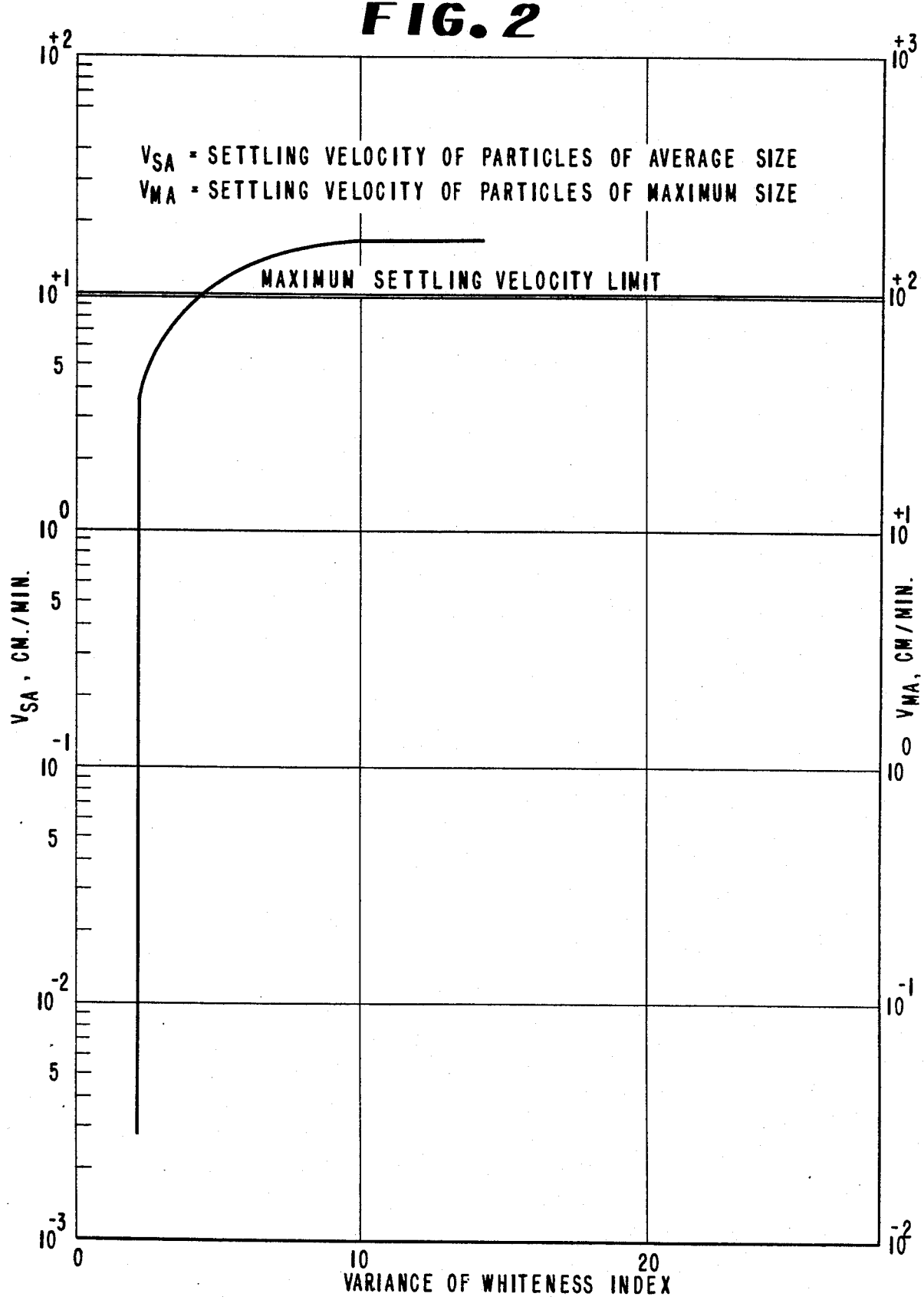
FIG. 2 is a graph showing the effect of particle settling rate on the variance of whiteness of the simulated granite.

The polymers useful in the compositions of the invention are polymers having a sodium line refractive index ($n_D$) between about 1.4 to 1.65 as measured by ASTM-(D 542)27. In addition to the refractive index, the polymers, when cured, should be hard (Tukon hardness greater than 5 knoop, preferably greater than 15 knoop); should have less than 1% (preferably less than 0.5%) by weight (based on total granite weight) of volatile constituents; and have moderate to good clarity (optical density to visible light, less than 0.2, preferably less than 0.1).

Optical density is determined by measuring the transparency of 0.01 inch thick films at wave lengths in the visible range, 4000–8000 Angstroms, using a spectrophotometer (e.g. a Cary Model 11 M Recording Spectrophotometer) or measuring the G, R and B transparency of 0.01 inch thick films using a Model V Colorimeter Colormaster (Manufacturers Engineering and Equipment Corp., Warrington, Pa.) and then calculating using the equation:

$$\text{Optical density} = \log_{10}(I_i/I_t)$$

where:

$I_i$ = Intensity of incident light
$I_t$ = Intensity of transmitted light
$(I_i/I_t)^{-1}$ = Transparency A particularly good and especially preferred polymer which meets all of the above properties is poly (methyl methacrylate). In the castable composition, it is often introduced as a sirup of polymer in methyl methacrylate monomer. Methods of preparing such a sirup are described in the aforementioned Slocum and Duggins patents. Another method of preparing a sirup is to simply dissolve polymer in the monomer. This latter method is quite useful for adjusting viscosity of the castable composition since molecular weight of polymer as well as concentration can be varied in such a way as to control the rheology.

The amount of fluid polymerizable constituent required in the castable composition is at least 30% by volume. Methyl methacrylate monomer is preferred as a major constituent.

Other monomers useful as fluid polymerizable constituents are alkyl acrylates and methacrylates in which the alkyl groups can be from 1 – 18 carbon atoms, but preferably 1-4 carbon atoms. Suitable acrylic monomers are methyl acrylate; ethyl acrylate and methacrylate; n-propyl and i-propyl acrylates and methacrylates; n-butyl, 2-butyl, i-butyl and t-butyl acrylates and methacrylates; 2-ethylhexyl acrylate and methacrylate; cyclohexyl acrylate and methacrylate; ω-hydroxyalkyl acrylates and methacrylates; N,N-dialkylaminoalkyl acrylates and methacrylates; N-[t-butyl]aminoethyl acrylate and methacrylate, etc.

Other unsaturated monomers include such preferred compounds as bis-[β-chloroethyl] vinylphosphonate; styrene; vinyl acetate; acrylonitrile; methacrylonitrile; acrylic and methacrylic acids; 2-vinyl- and 4-vinylpyridines; maleic acid, maleic anhydride and esters of maleic acid; acryl amide and methacrylamide; itaconic acid, itaconic anhydride and esters of itaconic acid and multifunctional monomers for crosslinking purposes such as unsaturated polyesters; alkylene diacrylates and dimethacrylates; allyl acrylate and methacrylate; N-hydroxymethylacrylamide and N-hydroxymethylmethacrylamide; N,N'-methylene diacrylamide and dimethacrylamide; glycidyl acrylate and methacrylate; diallyl phthalate; divinylbenzene; divinyltoluene; trimethylolpropane triacrylate and trimethacrylate; pentaerythritol tetraacrylate and tetramethacrylate; triallyl citrate and triallyl cyanurate.

Soluble polymers can be used to control viscosity of the castable composition. Acrylic polymers are especially preferred. The term "acrylic polymer" as used herein means (a) alkyl methacrylate homopolymers (b) copolymers of alkyl methacrylates with other alkyl methacrylates or alkyl acrylates or other ethylenically unsaturated monomers or all of them (c) alkyl acrylate homopolymers and (d) copolymers of alkyl acrylates with other alkyl acrylates or alkyl methacrylates or other ethylenically unsaturated monomers or all of them. The alkyl groups can be from 1-18 carbon atoms, preferably 1-4 carbon atoms.

Suitable monomers for preparing such polymers are methyl acrylate and methacrylate, ethyl acrylate and methacrylate; n-propyl and isopropyl acrylates and methacrylates; n-butyl, 2-butyl, i-butyl and t-butyl acrylates and methacrylates; 2-ethylhexyl acrylate and methacrylate; cyclohexyl acrylate and methacrylate; ω-hydroxyalkyl acrylates and methacrylates, N,N-dialkylaminoalkyl acrylates and methacrylates; N-[t-butyl] aminoalkylacrylate and methacrylate, styrene; bis-[β-chloroethyl] vinylphosphonate; vinyl acetate; acrylonitrile; methacrylonitrile; 2-vinyl and 4-vinyl pyridines; acrylic and methacrylic acids; maleic acid, maleic anhydride and esters of maleic acid; acrylamide and methacrylamide; itaconic acid, itaconic anhydride and esters of itaconic acid; etc.

Other polymers which have the requisite refractive index and can be used in the proper sirup are polystyrene; unsaturated polyesters including styrenated and maleinated alkyds and oils (e.g. linseed oil); cellulose esters such as cellulose acetate and cellulose acetate butyrate; cellulose ethers such as ethyl cellulose; polyamides; polycarbonates; polyvinyl chlorides and copolymers; polyvinylidine chloride; polychloroprene and theremosetting epoxy and melamine resins. The important thing is that the polymer or mixture of polymers must be soluble in the fluid polymerizable constituent, have a sodium line refractive index of about 1.4-1.65, and preferably also have an optical density to visible light less than 0.2 and a hardness when cured greater than 5 knoop. Refractive indices of common polymers are given in various handbooks, e.g. Handbook of Tables for Applied Engineering, The Chemical Rubber Company, Cleveland, Ohio, 1970. They may also be measured by use of ASTM-(D542)27.

Fillers used with the polymers to make up the matrix of the simulated granite must have an amorphous or mean crystalline axial refractive index ($n_D$) between 1.4 and 1.65. Refractive indices of common minerals are also given in various handbooks including that mentioned above.

The filler particles must be small so as not to be seen as a distinct phase in the polymer and are preferably used at a concentration to give an overall translucency in the matrix portion of the final product. It has been found that the filler particles should have a maximum particle size in the longest dimension of less than 100 microns, preferably less than 70 microns. The translucency of the polymer-filler matrix is such that the optical density to visible light of a 0.01 inch thick film is less than 1.5, preferably less than 1.0.

Matrix fillers useful are powdered talc; powdered quartz; fine silica such as the fumed silicas and Cabosil ® sold by Cabot Corporation; wood flour; diatomaceous earth; gypsum; powdered glass; clay minerals such as china clay (Kaolin), illite, montmorillonite, bentonite and pyrophyllite; powdered chalk, marble and limestone; colloidal asbestos microfiber; aluminum silicate; aluminum stearate; mullite, calcium silicate; anhydrite; boracite; borax and alumina trihydrate.

While the latter, alumina trihydrate, is the most preferred filler, other preferred fillers are powdered quartz, powdered glass, fine silica, the fine clay minerals, powdered talc and powdered calcium carbonate.

The matrix composition is preferably about 40-80% by volume (most preferably about 40-60%, based on total granite composition) of polymer and 1 to about 50% by volume (most preferably about 5-40%, based on total granite composition) of filler. Alumina trihydrate is preferred because it has a refractive index in the right range and is especially effective in improving the fire resistant properties of the final product.

Alumina trihydrate has the formula $Al_2O_3.3H_2O$. Alumina trihydrate is sold by designation related to particle size, but the particles within a given grade or designation have a distribution of sizes. The size of the particles used as filler will affect the ability of the polymer to wet the particles and the ease with which the castable mixture is poured or molded. The maximum particle size in the longest dimension is less than about 70 microns. The particles will usually range from about 0.1 to about 70 microns. The number average particle size as measured by Imanco ® Quantimet 720 analysis is about 30 ± 10 microns.

To prepare a simulated granite article, the abovedescribed matrix of polymer and filler needs to have larger particles randomly distributed therein. These larger particles must be of two types — (1) opaque particles (either colored or uncolored) and (2) transparent or translucent particles (either colored or uncolored).

Both types of particles should have a minimum particle size greater than about 200 microns in the smallest dimension, preferably greater than about 250 microns and most preferably, the minimum, average and maximum particle sizes should be in the range of about 250–5000 microns. For some aesthetic effects, there can be particles present having a particle size much greater than 5000 microns in the largest dimension, e.g. 0.25 – 0.5 inch or larger, provided the simulated granite is thick enough to hold them. However, in no event should the particles be so large that they settle in the castable composition at an initial rate in excess of 100 cm./min., preferably 10 cm./min. and most preferably 2 cm./min.

The critical viscosity of the casting composition required to prevent the largest particles from settling too fast is determined by one of the following methods:

(1) For particles that are not highly acicular (i.e. L/D ratio <5)

(a) Determine the average weight and density ($d_p$) of the largest particle in the castable composition.

(b) Calculate the average volume, ($V_p$) of the largest particles by dividing the average weight by the average density.

(c) Estimate the average density, ($d_{c.c.}$), of the castable composition from the measured densities of each of the ingredients and the desired composition.

(d) assume the largest particle to be spherical and Newtonian in behavior. (Experiments indicate that this is a reasonable assumption for most particles of irregular shape which are not highly acicular or planar and do not significantly swell or change composition in the sirup.)

(e) Calculate the critical minimum kinematic viscosity, ($v_c$), by use of the following equation:

$$v_c = \frac{5040 (v_p)^1 [D_p - d_{c.c.}]}{V_p d_{c.c.}}$$

where:

$v_c$ = critical minimum kinematic viscosity of casting composition in stokes
$v_p$ = volume of largest particle in cm³
$D_p$ = Density of largest particle in g./cm.³
$d_{c.c.}$ = Density of casting composition in g./cm.³
$V_p$ = Maximum velocity of largest particle = 100 cm/min., preferably 10 cm./min., most preferably 2 cm./min.

(f) Adjust the viscosity of the casting composition well above the critical minimum value, preferably above the preferred value and most preferably above the most preferred value, but below the critical maximum viscosity (1000 stokes, preferably 500 stokes, most preferably 200 stokes) by adjusting the polymer concentration in the sirup, increasing the molecular weight or both.

(2) For particles that are highly acicular or planar; (L/D>5):

(a) Prepare a high solids, high viscosity polymer solution similar to the sirup being used in the castable composition, e.g. poly (methyl methacrylate) in methyl methacrylate monomer.

(b) Prepare several solutions covering a range of viscosities by dilution of the high solids stock solution with various amounts of solvent (e.g. methyl methacrylate monomer).

(c) Determine the average rate of fall in cm./min. of several of the largest particles in each of the solutions by filling a cylindrical glass tube (e.g. a 100 cc. burette) with each of the polymer solutions and timing the fall of several of the largest particles between two measured marks on the cylinder.

(d) Determine the kinematic viscosity in stokes of each of the polymer solutions using the Gardner-Holdt bubble viscometer, direct method ASTM D 1545.

(e) Plot the average rates of fall of the largest particles versus kinematic viscosities of the prepared solutions.

(f) Estimate the critical minimum viscosity from the plot.

(g) Adjust the viscosity of the casting composition as in (1) above.

Many large opaque particles can be used to make the simulated granite. These particles can be colored or uncolored. Typical mineral particles that can be used are calcined talc, magnetite, siderite, ilmenite, goethite, galena, graphite, anthracite and bituminous coal, chalcopyrite, pyrite, hematite, limonite; pyroxenes such as augite; amphiboles such as hornblende; biotite, sphalerite, anatase, corunbum, diamond, carborundum, anhydrite, chalk, diurite, rutile, sandstone, shale, slate, sparite, vermiculite, natural granite, peat and basalt. Other useful materials are chips of brick, charcoal, concrete, plaster, porcelain, sawdust, seashells, slag, wood and the like, various filled or pigmented chips of insoluble or crosslinked polymers such as ABS resins, cellulose esters, cellulose ethers, epoxy resins, polyethylene, ethylene copolymers, melamine resins, phenolic resins, polyacetals, polyacrylics, polydienes, polyesters, polyisobutylenes, polypropylenes, polystyrenes, urea/formaldehyde resins, polyureas, polyurethanes, polyvinyl chloride, polyvinylidene chloride, polyvinyl esters and the like.

Useful large translucent and transparent particles are natural or synthetic minerals or materials such as agate, alabaster, albite, calcite, chalcedony, chert, feldspar, flint quartz, glass, malachite, marble, mica, obsidian, opal, quartz, quartzite, rock gypsum, sand, silica, travertine, wollastonite and the like; and moderately filled or unfilled, pigmented or dyed, insoluble or crosslinked chips of polymers referred to in the last paragraph.

The large opaque, translucent and/or transparent particles are present in the simulated granite at a concentration of about 0.1–50% by volume, preferably about 1–35% by volume. The opaque particles are most preferably at a concentration of about 5–25% by volume while the concentration of the translucent or transparent particles is most preferably about 5–30% by volume.

Additional additives can be included in the simulated granite article to give it decorative effects or to color the matrix background. These additives can be incorporated at a concentration up to about 10% by volume; however, when dyes or pigments are used to color the matrix, the color concentration cannot be so great as to hide the large opaque, translucent and transparent particles. The optical density of a 0.05 inch thick wafer must be less than 3.0 and the surface must exhibit a granite-like pattern.

The surface patterns of a number of different natural granites have been defined by IMANCO ® Quantimet 720 image analysis. These patterns have about 0.1 to 40% area detectable at densitometric level 820, about 0 to 30% additional area detectable at level 860, about 0.1 to 25% additional area detectable at level 900, about 0 to 25% additional area detectable at level 950 and about 15 to 95% additional area detectable at a level greater than 950. It is preferred that the simulated granite have essentially the same surface pattern.

In addition to dyes and pigments, other useful decorative additives are metallic fibers, dusts, flakes, chips or shavings such as aluminum, copper, bronze, brass, chromium, nickel, gold, iron, steel, platinum, silver, tin, titanium, tungsten, zinc and the like; non-metallic chips or flakes such as titanium nitride, nickel sulfide, cobalt sulfide, anhydrous chromic chloride and magnesium sulfide; and natural or colored flocks or chopped fibers such as asbestos, rayon, cotton, nylon, flax, polyester, glass, hair, hemp, paper pulp, polyacrylonitrile, polyethylene, polypropylene, protein, rock wool, wood fiber, wool and the like.

The simulated granite is prepared by first preparing a castable composition. This composition can be made by preparing a mixture of the large opaque particles, the large transparent and/or translucent particles and, if desired, any of the solid optional ingredients such as the decorative particles. The matrix for the composition is prepared by mixing the polymerizable constituent, a viscosity control constituent, an initiating amount of an initiator system for the polymerizable constituent, the small filler particles and any other optional ingredients such as a cross-linking or coloring agent. These two mixtures are mixed at a ratio which will give the desired visual effect in the final product and then this final mixture, called the castable composition is poured onto a surface which takes the form of the final article, e.g. a flat surface for simulated granite sheets or a mold for simulated granite shaped articles. The poured mixture is then cured autogenically. The matrix mixing can be conducted at a temperature in the range of about 20° to 50° C. provided that the initiator system is not added until ready to cast.

The viscosity of the castable composition is important. If the viscosity is too low, the large particles tend to settle too quickly and result in a final product having inferior aesthetics. If the viscosity is too high, pits, air pockets and craters tend to form on the surface of the article. Some pit formation, however, may be tolerable and attractive for some uses of the final granite article.

Thus, the kinematic viscosity of the castable composition should be no greater than about 1000 stokes, preferably below 500 stokes and most preferably below 200 stokes as measured using a Gardner-Holdt bubble viscometer, direct method, ASTM D 1545. The temperature at which viscosity is measured must be the same as that as casting, usually room temperature.

The minimum viscosity is a function of the settling rate of the largest particles in the castable composition. This is determined by either Procedure (1) or (2) on pages 10-13. The minimum initial falling velocity of the largest particle in the castable composition should be less than about 100 cm./min., preferably less than 10 cm./min. and most preferably less than 2 cm./min.

Other additives can be present in the castable composition. Typical additives include ultra-violet light stabilizers; fire retardant agents such as fire retardant polymers (e.g. polyvinyl chloride, polyvinylidene chloride and copolymers of these); fire retardant monomers, (e.g. bis-[$\beta$-chloroethyl] vinylphosphonate) and inorganic chemicals such as zinc phosphate, cross-linking agents for the polymerizable constituent, flow agents, anti-stick or release agents, and the like. These materials can be added in amounts typically employed and known in the coating and casting arts.

The preferred matrix mixture which is based on a methyl methacrylate polymer in monomer sirup can contain a cross-linking agent added to the sirup in an amount up to 20% by weight, preferably about 0.5-10%, based on the weight of sirup. Any suitable poly-unsaturated or other polyfunctional cross-linking agent can be used, e.g. ethylene glycol diacrylate and dimethacrylate; propylene glycol diacrylate and dimethacrylate; polyethylene glycol diacrylate and dimethacrylate; trimethylol propane trimethacrylate; pentaerythritol tetramethacrylate; glycidyl methacrylate; divinyl benzene; triallyl cyanurate; N-(hydroxymethyl)acrylamide; diallyl phthalate; allyl acrylate and methacrylate; N,N'-methylene diacrylamide and dimethacrylamide; divinyl toluene and triallyl citrate.

Polymerization of the mixture can be accomplished by using any suitable initiator system for the polymerizable constituent used. For the above-described sirup, about 0.1-2% by weight, based on the weight of sirup, of a conventional free-radical initiator is employed. Preferably the initiator is a peroxy compound or an azo compound. Hydrogen peroxide, lauroyl peroxide, benzoyl peroxide, t-butyl perbenzoate, t-butyl peroxypivalate, t-butyl peroxymaleic acid, $\alpha,\alpha$-'-azobisisobutyronitrile;2,2'-azo-bis-[$\alpha,\beta$-dimethylvaleronitrile]; 4-t-butylazo-4-cyano-valeric acid; 4,4'-azo-bis-[4-cyanovaleric acid] and azodicyclohexane carbonitrile are examples of such initiators. A particularly preferred cure system is described in U.S. Pat. No. 3,775,364, issued Nov. 27, 1973, to Ray B. Duggins. This process involves adding to the polymerizable consitituent, preferably the polymer-in-monomer sirup discussed above, a peroxy compound and 0.05 to 5.0 parts per hundred, based on the weight of the polymerizable material, of water as a promoter for the peroxy compound. The peroxy compound is preferably a hemiperester of maleic acid, e.g., monotertiarybutyl peroxymaleate sometimes referred to as t-butyl peroxy maleic acid, in combination with a basic compound. As such basic compounds, one may use any metal compound that has a $pK_b$ less than 6.0 in water at 25° C. and is miscible enough with the sirup to react with the acid of the hemiperester to form the metal salt of the hemiperester. Although it is most practical to add the basic compound after first dissolving the hemiperester of maleic acid in the polymer-in-monomer sirup, it is not essential. The curing may be accomplished autogenically by merely exposing the sirup containing the metal salt of the hemiperester of maleic acid to a temperature of 20°-45° C. Elevated temperatures and higher pressures may be used if desired.

Small amounts of mercaptan chain transfer agents are accelerators for the polymerization. About 0.01-2.0 parts by weight, based on the weight of the polymerizable material, can be used. Suitable mercaptan accelerators are n-dodecyl mercaptan, t-dodecyl mercaptan, octadecyl mercaptan, dipentene dimercaptan, 2-mercaptoethanol, alkyl mercaptoacetates, ethylene glycol dimercaptoacetate, ethylene bis-[beta-mercaptopropionate], trimethylolethane trithioglycolate, trimethylolpropane trithioglycolate, pentaerythritol tetrathioglycolate and the like.

The artifical granite articles of the invention have excellent falling-ball impact resistance at granite thicknesses as low as ¼ inch and are warmer to the touch than natural granite because they have a lower thermal conductivity. They are resistant to low temperature chipping, thermal and humidity expansion, and humidity cold crack. The casting composition can be cast on glass, aluminum, stainless steel and the like to give a high gloss, smooth surface very much like natural, high polished granite. The surface and edges of the articles can be further sanded and polished, if desired. The machinability is far superior to natural granite. They can be drilled, cut and lathed in ways simpler than those required for natural granite.

The invention can be further illustrated by the following examples wherein percentages are by volume unless otherwise indicated.

EXAMPLE 1

A. About 292.1 g. (45.2 parts by volume) of a sirup consisting of about 17.9% by weight poly(methyl methacrylate) (inherent viscosity = 0.44 ± 0.03) as viscosity control constituent, 0.9% by weight ethylene dimethacrylate as crosslinking agent and 81.2% by weight methyl methacrylate monomer, having a refractive index ($n_D$) in the polymerized state of about 1.49 ± 0.02, was mixed in a one-liter resin kettle with, B. about 11.18 g. (1.7 parts by volume) of Luperox ® PMA-25 (consisting of about 25% by weight t-butyl-peroxymaleic acid in 75% by weight plasticizer) (Pennwalt Corporation, Lucidol Division) and C. about 364.0 g. (21.9 parts by volume) of alumina trihydrate, having a mean crystalline axial refractive index ($n_D$) of about 1.58 ± 0.02, a mean particle size of about 30 ± 12 microns and a maximum particle size of about 65 ± 5 microns in diameter as determined by IMANCO ® Quantimet 720 particle size analysis.

D. About 626.5 g. (30.4 parts by volume) of a mixture of (1) about 14.6 parts by volume (based on total casting composition) of opaque calcined talc having a number average particle size of about 580 microns, a minimum particle size of about 250 microns in shortest dimension, a maximum particle size of about 1200 microns in longest dimension and an optical density to visible light greater than 2.0; (2) about 6.3 parts by volume (based on total casting composition) of opaque magnetite having a number average particle size of about 580 microns, a minimum particle size of about 250 microns in shortest dimension, a maximum particle size of about 1200 microns in longest dimension and an optical density to visible light greater than 2.0; and (3) about 9.5 parts by volume of translucent wollastonite having a number average particle size of about 340 microns, a minimum particle size of about 250 microns in shortest dimension, a maximum particle size of about 1200 microns in longest dimension and an optical density to visible light of about 1.2 ± 0.1 was mixed into (C).

E. About 2.7 g. (0.42 part by volume) of demineralized water was mixed into (D) and the mix was de-aerated by applying vacuum while stirring vigorously.

F. About 2.7 g. (0.12 part by volume) of magnesium oxide powder (having a pH of about 10.5 in saturated aqueous solution) was mixed into (E) and the mix was de-aerated again by applying vacuum while stirring.

G. About 1.4 g. (0.22 part by volume) of ethylene glycol dimercaptoacetate was mixed into (F) vigorously and de-aerated by applying vacuum while stirring.

H. The pour viscosity of the wet mix (G) was about 20 stokes and the initial settling velocity of particles of maximum size was about 2.9 cm./min.

I. A wooden vacuum mold with an 8 inch × 8 inch × ⅜ inch deep cavity was covered with polyvinyl alcohol film which had been humidified at 100% relative humidity until it was soft and elastic. The film was pulled down tightly into the mold cavity by application of vacuum to numerous holes around the outside top perimeter of the mold and around the bottom inside perimeter of the cavity. A piece of high polished 0.005 inch thick aluminum was cut so that it just fit inside the cavity over the top of the polyvinyl alcohol film and was held tightly on the bottom by double faced masking tape placed between aluminum and polyvinyl alcohol film. The castable composition prepared above was poured into the cavity and spread so that it filled the entire cavity uniformly.

J. A 0.001 inch thick film of cellophane was then placed over the mix and rolled firmly down using a solid steel rolling cylinder about 2 inches in diameter. This pressed the mix firmly into all corners of the mold cavity. A glass wool blanket was placed over the cellophane for insulation and the mix polymerized autogenically.

K. Five minutes after adding the ethylene glycol dimercaptoacetate, the mix had set to a solid mass with an estimated viscosity significantly higher than 1000 stokes.

L. The exotherm peaked at about 110° C. in about 15 minutes after the ethylene glycol dimercaptoacetate had been added.

M. After 60 minutes, the casting was removed from the mold, cooled at ambient room temperature and stripped from the aluminum giving a hard ⅜ inch thick sheet which resembled polished natural gray granite.

N. The surface was uniform in randomness of pattern and this uniformity extended throughout the thickness of the sheet.

O. The whiteness index compared favorably with that of natural gray granite (Dark Barre) and IMANCO ® Quantimet 720 surface image analysis shows that the percent area detected at each densitometric level is relatively similar for the two materials (Table I).

TABLE I

|  | Product of Example I | Natural Gray Granite |
|---|---|---|
| Whiteness Index * | (+) 20 ± 1 | (+) 17 ± 1 |
| Surface Image Analysis (% area data are accumulative): |  |  |
| Detection Level 820, % Area | 3.9 ± 0.5 | 4.2 ± 0.9 |
| Detection Level 860, % Area | 10.9 ± 0.9 | 10.2 ± 1.1 |
| Detection Level 900, % Area | 22.9 ± 1.3 | 20.4 ± 1.2 |
| Detection Level 950, % Area | 44.9 ± 1.1 | 40.2 ± 0.9 |
| >Detection Level 950, % Area | 100.0 | 100.0 |

* Whiteness index is calculated using the equation:
Whiteness index = 4 B − 3 G
B and G reflectance values are obtained using a Colormaster Colorimeter.

P. The sheet possessed less than 0.5% by weight residual monomer.

Q. A 0.05 inch thick wafer was cut from the smooth surface side of the sheet. The optional density to visible light was about 2.0

EXAMPLE 2

A. About 301.1 g. (51.9 parts by volume) of a sirup consisting of about 19.8% by weight poly(methyl methacrylate) (inherent viscosity = 0.44 ± 0.03) as viscosity control constituent 2.1% by weight ethylene dimethacrylate as crosslinking agent and 78.1% by weight methyl methacrylate monomer, having a refractive index ($n_D$) in the polymerized state of about 1.49 ± 0.02, was mixed in a one-liter resin kettle with:

B. about 275.2 g. (18.6 parts by volume) of the alumina trihydrate of Example 1;

C. about 275.2 g. (16.5 parts by volume) of the opaque calcined talc of Example 1;

about 55.0 g. (3.81parts by volume) of opaque filled black polypropylene particles consisting of about 19.3% by weight polypropylene, 77.3% by weight barytes No. 1, 2.4% by weight Sterling R carbon black (Cabot Corp.) and 1.0% by weight stearic acid, having a number average particle size of about 390 microns, a minimum particle size of about 250 microns, a maximum particle size of about 1100 microns in longest dimension, and an average optical density to visible light greater than 2.0 were mixed into (B).

D. about 143.1 g. (7.8 parts by volume) of translucent wollastonite, having a number average particle size of about 340 microns, a minimum particle size of about 250 microns, a maximum particle size of about 1200 microns in longest dimension and an optical density to visible light of about 1.2 ± 0.1 was mixed into (C).

E. The number average particle size of all particles added in (C) and (D) was about 430 microns and the largest, heaviest particles added were wollastonite, having a particle size of about 1200 microns in longest dimension and a density of about 3.0 ± 0.1 g./cc.

F. About 4.40 g. (0.76 part by volume) of Luperox ® PMA-50 (consisting of about 50% by weight t-butyl-peroxymaleic acid in 50% by weight plasticizer) (Pennwalt Corporation, Ludicol Division) and about 2.24 g. (0.38 part by volume) of demineralized water were mixed into (D) and the mix was de-aerated by applying vacuum while stirring vigorously.

G. About 2.24 g. (0.11 part by volume) of magnesium oxide powder (having a pH of about 10.5 in saturated aqueous solution) was mixed into (F) and de-aerated again by applying vacuum while stirring.

H. About 1.10 g. (0.14 part by volume) of ethylene glycol dimercaptoacetate was mixed into (G) vigorously and de-aerated by applying vacuum while stirring.

I. The pour viscosity of the wet mix (H) was about 46 stokes; the initial settling velocity of particles of average size was about 0.08 cm./min.; the initial settling velocity of particles of maximum size (wollastonite) was about 0.7 cm./min.

J. The wet mix was poured into a 5½inch × 8½inch × 1 inch deep aluminum pan, insulated with glass wool, and polymerized autogenically. Five minutes after adding the ethylene glycol dimercaptoacetate (accelerator), the mix had set to a solid, non-flowable mass, with an estimated viscosity significantly higher than 1000 stokes.

K. After 60 minutes, the pan was cooled at ambient room temperature, and the casting was removed from the pan, giving a hard, void-free, ⅞-inch thick casting with a smooth, glossy surface wherever it had contacted the aluminum, which visually resembled polished natural gray granite.

L. The surface was uniform in its randomness of pattern and this uniformity extended throughout the thickness of the sheet.

M. The sheet possessed less than 0.5% by weight residual monomer.

N. A 0.05 inch thick wafer cut from the sheet had an optical density to visible light of about 2.4.

O. The whiteness index was about (+) 19 ± 1.

P. Surface image analysis:

|  | % Area (accumulative) |
|---|---|
| Detection level 820 | 7.4 ± 0.6 |
| Detection level 860 | 16.3 ± 0.8 |
| Detection level 900 | 29.6 ± 1.0 |
| Detection level 950 | 50.8 ± 0.9 |
| Detection level >950 | 100.0 |

CONTROL EXAMPLE 3

Example 2 was repeated except for the following changes:

A. The polymerizable constituent consisted of about 0.4% by weight of ethylene dimethacrylate in 99.6% by weight methyl methacrylate monomer.

B. Parts by volume of ingredients:

|  | Parts by Volume |
|---|---|
| Sirup (A) | 52.99 |
| Alumina trihydrate | 18.15 |
| Calcined talc | 16.11 |
| Filled black polypropylene | 3.76 |
| Wollastonite | 7.66 |
| Luperox ® PMA-50 | 0.72 |
| Demineralized water | 0.37 |
| Magnesium oxide | 0.10 |
| Ethylene glycol dimercaptoacetate | 0.14 |
|  | 100.00 |

C. The pour viscosity of the wet mix was about 0.22 stoke; the initial settling velocity of particles of average size was about 17.4 cm./min.; the initial settling velocity of particles of maximum size was about 150 cm./min.

D. About five minutes after adding ethylene glycol dimercaptoacetate, the mix had set to a non-flowable mass with an estimated viscosity greater than 1000 stokes. E. A hard, void-free, non-uniformly filled sheet was obtained. Heavier opaque and translucent particles collected in random piles at the bottom of the casting. Hence, the material did not resemble natural granite.

EXAMPLE 4

Example 2 was repeated except for the following changes:

A. The sirup consisted of about 6.6% by weight poly (methyl methacrylate) (inherent viscosity = 0.44 ± 0.03), 0.7% by weight ethylene dimethacrylate, and 92.7% by weight methyl methacrylate monomer.

B. Parts by volume of ingredients:

|  | Parts by Volume |
|---|---|
| Syrup (A) | 52.63 |
| Alumina trihydrate | 18.30 |
| Calcined talc | 16.22 |
| Filled black polypropylene | 3.78 |
| Wollastonite | 7.72 |
| Luperox ® PMA-50 | 0.74 |
| Demineralized water | 0.37 |
| Magnesium oxide | 0.10 |
| Ethylene glycol dimercaptoacetate | 0.14 |
|  | 100.00 |

C. The pour viscosity of the wet mix was about 1.0 stoke; the initial settling velocity of particles of average size was about 3.8 cm./min.; the initial settling velocity of particles of maximum size was about 33 cm./min.

D. About five minutes after adding ethylene glycol dimercaptoacetate, the mix had set to a non-flowable mass, with an estimated viscosity greater than 1000 stokes.

E. After 60 minutes, the pan was cooled at ambient room temperature. The casting was removed from the pan.

F. A hard, void-free, slightly diverging concave-convex ⅜-inch thick casting was obtained, indicating that differential shrinkage occurred during polymerization.

G. The bottom surface (against the aluminum pan) was slightly convex but uniform in randomness of pattern. This surface was whiter (whiteness index = (+) 28 ± 1) than that of Example 2.

H. The particle distribution was not uniform in thickness direction. Heavier particles were absent in the upper third of the casting, but increased in concentration toward the bottom surface. The upper surface of the casting was slightly concave, indicating that strongest shrinkage forces were at the top.

I. Residual monomer content was less than 0.5%.

J. The optical density of a 0.05 inch thick wafer to incident visible light was less than 3.0.

EXAMPLE 5

A. A series of castings were made by the procedure outlined in Example 2. The parts by volume of ingredients were kept constant except for those in the sirup. The concentration and molecular weight of poly(methyl methacrylate) in the sirup were varied to vary the viscosity of the wet mix and the velocity of settling of macro-particles.

|  | Parts by Volume |
|---|---|
| Sirup | 52.30 |
| Alumina trihydrate | 18.40 |
| Calcined talc | 16.30 |
| Filled black polypropylene | 3.80 |
| Wollastonite | 7.80 |
| Luperox ® PMA-50 | 0.75 |
| Demineralized water | 0.40 |
| Magnesium oxide | 0.10 |
| Ethylene glycol dimercaptoacetate | 0.15 |
|  | 100.00 |

B. The concentration of poly (methyl methacrylate) in the sirup varied from 0 to about 10% by volume.

C. The inherent viscosity of the poly(methyl methacrylate) varied from about 0.4 to about 1.2

D. The pour viscosity of wet mix varied from about 0.2 to about 1000 stokes.

E. The initial settling viscosity of particles of average size varied from about 0.003 to about 17 cm./min.

F. The initial settling velocity of particles of maximum size varied from about 0.03 to about 170 cm./min.

G. The initial settling velocities of particles of average and largest size are plotted versus surface whiteness indices of casting in FIG. I. The velocity data are also plotted against the statistical variances of whiteness indices within the surface of each casting in FIG. II. These two figures show the following:

(1) The maximum particle size velocities are most important in determining uniformity of particle distribution in the simulated granite.

(2) At initial maximum particle size velocities less than 2 cm./min., the surface whiteness indices of castings prepared according to the conditions of the invention vary only slightly (FIG. I). In addition, the statistical variance of surface whiteness index within the surface of each individual casting is constant (FIG. II). These two results show that the particle distribution and, hence, the color and granite-like appearance within each sheet and between sheets is relatively uniform. It is also observed that the backside (upside during casting) of each sheet also possesses a granite-like appearance (not shown on graph) showing that uniformity of particle distribution in the thickness direction is also good.

(3) In castings having initial maximum particle size velocities between about 2 to 4 cm./min., the surface whiteness indices vary significantly (FIG. I), but the statistical variance of surface whiteness index within the surface of each sheet does not. (FIG. II). This shows that the particle distribution in the surface of each sheet varies from sheet to sheet due to different degrees of settling before the casting sets up. The heavier talc and wollastonite particles settle faster than the black particles causing whitening. The uniformity of particle distribution in thickness direction also changes from sheet to sheet and the back of the granite no longer resembles the surface. However, the uniformity of each surface is good and useful and attractive products can be made.

(4) In castings having initial maximum particle size velocities between about 4 and about 100 cm./min., the surface whiteness indices again do not vary significantly (FIG. I) and the variance of surface whiteness index within the surface of each sheet is still relatively constant. These results show that the surface of each sheet is saturated with particles and the composition does not change much either from sheet to sheet or within the surface of any one sheet, but the composite in the thickness direction of the sheet is still changing significantly as particles settle more and more upon the first surface layer. However, since the surface of one side of the casting is still uniform, attractive and useful articles with a granite-like look can be made.

(5) Finally, as the initial maximum particle size velocity exceeds about 100 cm./min., uniformity of surface is disturbed by rapid falling particles and processing conditions and the variance of surface whiteness index within each sheet is significantly increased. (FIG. II). Hence, the granite-like look and aesthetics diminish.

EXAMPLE 6

Example 2 was repeated except for the following changes:

A. The sirup consisted of about 20% by weight poly(ethyl methacrylate), 2% by weight ethylene dimethacrylate, 30% by weight methyl methacrylate monomer and 48% by weight ethyl methacrylate monomer.

B. The pour viscosity of the castable composition was about 30 stokes; the initial settling velocity of particles of average size was about 0.1 cm./min., the initial settling velocity of particles of maximum size was about 1.0 cm./min.

C. A void-free, ⅜-inch thick casting was obtained resembling polished natural gray granite. The surface pattern was uniform and the particle distribution was uniform throughout the thickness of the casting. The whiteness index was about 19 ± 0.4. A 0.05 inch thick wafer had an optical density to incident visible light less than 3.0.

EXAMPLE 7

Example 2 was repeated except for the following changes:

A. The sirup consisted of about 20% by weight poly (n-butyl methacrylate), 2% by weight ethylene dimethacrylate, and 78% by weight n-butyl methacrylate monomer.

B. The pour viscosity of the wet mix was about 35 stokes; the initial settling velocity of particles of average size was about 0.09 cm./min., and the initial settling velocity of particles of maximum size about 0.9 cm./min.

C. A ⅜-inch thick casting was obtained which resembled natural gray granite. The surface was uniform and so was particle distribution throughout the thickness of the casting. The whiteness index was about (+) 19 ± 0.4. A 0.05-inch thick wafer had an optical density to incident visible light less than 3.0.

EXAMPLE 8

Example 2 was repeated except for the following changes:

A. The sirup consisted of about 20% by weight poly (styrene), 2% by weight 1,4-divinylbenzene, 78% by weight styrene monomer.

B. The pour viscosity of the wet mix was about 45 stokes; the initial settling velocity of particles of average size was about 0.07 cm./min., and that of particles of maximum size about 0.7 cm./min.

C. A void-free, ⅜-inch thick casting was obtained which resembled polished natural gray granite. The surface was uniform and so was particle distribution throughout the thickness of the sheet. The whiteness index was about (+) 19 ± 0.5. A 0.05-inch thick wafer had an optical density to incident visible light less than 3.0.

EXAMPLE 9

Example 2 was repeated except for the following changes:

A. About 278.5 g. (18.6 parts by volume) of ground clear glass having a mean refractive index ($n_D$) of about 1.51, a number average particle size of about 50 ± 25 microns, and a maximum particle size of about 100 microns was added as a replacement for alumina trihydrate.

B. The pour visocisty of the wet mix was about 40 stokes; the initial settling velocity of particles of average size was about 0.08 cm./min., and that of particles of maximum size about 0.8 cm./min.

C. A ⅜-inch thick casting was obtained resembling polished natural gray granite. The surface was uniform and so was particle distribution throughout the thickness of the sheet. A 0.05-inch thick wafer had an optical density to incident visible light less than 3.0.

EXAMPLE 10

Example 2 was repeated except for the following changes:

A. About 264.2 g. (18.6 parts by volume) of bentonite having a number average particle size less than 1.0 micron and a maximum particle size less than 70 microns was added as a replacement for alumina trihydrate.

B. The pour viscosity was about 90 stokes; the initial settling velocity of particles of average size was about 0.04 cm./min., and that of particles of maximum size about 0.4 cm./min.

C. A ⅜-inch thick casting was obtained resembling polished natural gray granite. The surface was uniform and so was particle distribution throughout the thickness of the sheet. A 0.05-inch thick wafer had an optical density to incident visible light less than 3.0.

EXAMPLE 11

Example 2 was repeated except for the following changes:

A. About 285.1 g. (18.6 parts by volume) of kaolin having a mean crystalline axial refractive index ($n_D$) of about 1.56 and particles ranging in size from about 0.1 - 3 microns was added as a replacement for alumina trihydrate.

B. The pour viscosity was about 100 stokes; the initial settling velocity of particles of average size was about 0.03 cm./min., and that of particles of maximum size about 0.3 cm./min.

C. A void-free, ⅜-inch thick casting was obtained resembling polished natural gray granite. The surface was uniform and so was particle distribution throughout the thickness of the casting. A 0.05-inch thick wafer had an optical density to incident visible light less than 3.0.

EXAMPLE 12

Example 2 was repeated except for the following changes:

A. About 307.0 g. (18.6 parts by volume) of powdered talc, having a mean crystalline axial refractive index ($n_D$) of about 1.59 and a mean particle size between 5 and 10 microns, was added as a replacement for alumina trihydrate.

B. The pour viscosity was about 100 stokes; the initial settling velocity of particles of average size was about 0.03 cm./min., and that of particles of maximum size about 0.3 cm./min.

C. A ⅜-inch thick casting was obtained resembling polished natural gray granite. The surface was uniform and so was particle distribution throughout the thickness of the sheet. A 0.05-inch thick wafer had an optical density to incident visible light less than 3.0.

EXAMPLE 13

Example 2 was repeated except for the following changes:

A. The sirup consisted of 9.0% by weight poly (methyl methacrylate), 13.0% by weight of a copolymer of vinyl chloride and vinylidene chloride marketed by B. F. Goodrich Co. as GEON® 222, 2.0% by weight ethylene dimethacrylate, and 76.0% by weight methyl methacrylate monomer, having a refractive index ($n_D$) in the polymerized state of about 1.50 ± 0.02.

B. The parts by volume of ingredients were:

|  | Parts by Volume |
|---|---|
| Sirup (A) | 44.81 |
| Alumina trihydrate | 22.08 (same particle size as in Example 2) |
| Calcined talc | 14.41 (same particle size as in Example 2) |
| Magnetite | 6.45 (min. part. size = 250 microns: avg. = 580 microns: max. =1200 microns) |
| Wollastonite | 9.78 (same particle size as in Example 2) |
| Luperox® PMA-25 | 1.71 |
| Demineralized water | 0.42 |
| Magnesium oxide | 0.12 |
| Ethylene glycol dimercapto-acetate | 0.22 |
|  | 100.00 |

C. The pour viscosity was about 50 stokes; the initial settling velocity of particles of average size was about 0.10 cm./min., and that of particles of maximum size about 1.1 cm./min.

D. A ⅜-inch thick casting was obtained resembling polished natural gray granite. The surface was uniform and so was particle distribution throughout the thickness of the casting. A 0.05-inch thick wafer had an optical density to incident visible light less than 3.0.

EXAMPLE 14

Example 2 was repeated except for the following changes:

A. The sirup consisted of about 11% by weight cellulose acetate butyrate, 9% by weight poly(methyl methacrylate), 1% by weight ethylene dimethacrylate, and 79% by weight methyl methacrylate monomer, having a refractive index ($n_D$) in the polymerized state of about 1.49 ± 0.02.

B. The pour viscosity was about 70 stokes; the initial settling velocity of particles of average size was about 0.05 cm./min., and that of particles of maximum size about 0.5 cm./min.

C. A ¾-inch casting was obtained resembling polished natural gray granite. The surface was uniform and so was particle distribution throughout the thickness of the casting. A 0.05-inch thick wafer had an optical density to incident visible light less than 3.0.

EXAMPLE 15

Example 2 was repeated except for the following changes:

A. The sirup consisted of about 5% by weight poly(methyl methacrylate), 2% by weight ethylene dimethacrylate, and 93% by weight methyl methacrylate monomer, having a refractive index ($n_D$) in the polymerized state of about 1.49 ± 0.02.

B. The parts by volume of ingredients were:

| | Parts by Volume | |
|---|---|---|
| Sirup A | 50.00 | |
| Colloidal chrysotile asbestos | 5.00 | (<20 microns in length) |
| Calcined talc | 25.55 | (same particle size as in Example 2) |
| Filled black polypropylene particles | 5.90 | (same composition and (particle size as in Example 2) |
| Wollastonite | 12.10 | (same particle size as in Example 2) |
| Luperox ® PMA-50 | 0.80 | |
| Demineralized water | 0.40 | |
| Magnesium oxide | 0.10 | |
| Etheylene glycol dimercaptoacetate | 0.15 | |
| | 100.00 | |

C. The pour viscosity was about 100 stokes; the initial settling velocity of particles of average size was about 0.03 cm./min., and that of particles of maximum size about 0.3 cm./min.

D. A ¾-inch thick casting was obtained resembling polished natural gray granite. The surface was uniform and so was particle distribution throughout the thickness of the casting. A 0.05-inch thick wafer had an optical density to incident visible light less than 3.0.

EXAMPLE 16

Example 2 was repeated except for the following changes:

A. The sirup was of the same composition as (A) in Example 15.

B. The parts by volume of ingredients were:

| | Parts by Volume | |
|---|---|---|
| Sirup (A), Example 15 | 50.00 | |
| Mica, (Wet ground) | 5.00 | (<50 microns in diameter) |
| Calcined talc | 25.55 | (same particle size as in Example 2) |
| Filled black polypropylene particles | 5.90 | (same particle size as in Example 2) |
| Wollastonite | 12.10 | (same particle size as in Example 2) |
| Luperox ® PMA-50 | 0.80 | |
| Demineralized water | 0.40 | |
| Magnesium oxide | 0.10 | |
| Ethylene glycol dimercaptoacetate | 0.15 | |
| | 100.00 | |

C. The pour viscosity was about 100 stokes; the initial settling velocity of particles of average size was about 0.03 cm./min. and that of particles of maximum size about 0.3 cm./min.

D. A ¾-inch thick casting was obtained resembling polished natural gray granite. The surface was uniform and so was particle distribution throughout the thickness of the casting. A 0.05-inch thick wafer had an optical density to incident visible light less than 3.0.

EXAMPLE 17

Example 2 is repeated except for the following changes:

A. The sirup is of the same composition as (A) in Example 15.

B. The parts by volume of ingredients are:

| | Parts by Volume | |
|---|---|---|
| Sirup (A), Example 15 | 50.00 | |
| Glass fiber, chopped strand | 5.00 | (¼ inch in length) |
| Calcined talc | 25.55 | (same particle size as in Example 2) |
| Filled black polypropylene particles | 5.90 | (same particle size as in Example 2) |
| Wollastonite | 12.10 | (same particle size as in Example 2) |
| Luperox ® PMA-50 | 0.80 | |
| Demineralized water | 0.40 | |
| Magnesium oxide | 0.10 | |
| Ethylene glycol dimercaptoacetate | 0.15 | |
| | 100.00 | |

C. A ¾-inch thick casting is obtained resembling polished natural gray granite. The surface is uniform and so is particle distribution throughout the thickness of the casting. A 0.05-inch thick wafer has an optical density to incident visible light less than 3.0.

EXAMPLE 18

A. About 2132.5 g. of a sirup consisting of about 10% by weight poly(methyl methacrylate), 10% by weight poly (vinyl chloride), 1% by weight ethylene dimethacrylate, and 79% by weight methyl methacrylate monomer, having a refractive index ($n_D$) in the polymerized state of about 1.50 ± 0.02 was prepared.

B. About 14,342 g. of opaque acrylic black particles were prepared as follows:

(1) About 4780 g. of sirup consisting of about 15.3% by weight poly(methyl methacrylate), 3.0% by weight GEON ® 222, 9.6% by weight ethylene dimethacrylate, and 72.1% by weight methyl methacrylate monomer was prepared.

(2) The following ingredients were mixed well in a planetary mixer and de-aerated by applying vacuum:

|  | Parts by Weight |
| --- | --- |
| Sirup (1) | 33.33 |
| Luperox ® PMA-25 | 0.78 |
| Cabot Co. Sterling ® R carbon black | 0.98 |
| Alumina trihydrate | 64.41 (same particle size as in Example 2) |
| Demineralized water | 0.20 |
|  | 99.70 |

(3) About 0.20 part by weight magnesium oxide was added to (2), mixed well and de-aerated by applying vacuum.

(4) About 0.10 part by weight ethylene glycol dimercaptoacetate was added to (3), mixed well and de-aerated by applying vacuum for one minute.

(5) A wooden vacuum mold with a 2 foot × 3 foot × ⅜ inch deep cavity was covered with polyvinyl alcohol film humidified at 100% R.H. The film was pulled down tightly into the mold cavity by application of vacuum to numerous holes around the outside rim of the mold and around the bottom inside edge of the mold cavity. The mix prepared in (4) was poured into the cavity on top of the humidified polyvinyl alcohol film.

(6) The mix was spread uniformly throughout the mold cavity, covered with another piece of humidified polyvinyl alcohol film, insulated with a glass wool blanket and allowed to polymerize autogenically.

(7) As soon as polymerization was complete, the casting was removed and allowed to cool at ambient room temperature. It was broken up into about one-inch-square pieces with a sledge hammer and then ground and sieved into various fractions according to particle size. The fraction having an average particle size of about 410 microns, a minimum particle size of about 250 microns, and a maximum particle size of about 1100 microns was collected for use as described below.

C. The following ingredients were mixed well in a planetary mixer and de-aerated by applying vacuum:

|  | Charge, g. | Parts by Volume |
| --- | --- | --- |
| Sirup (A) | 2132.5 | 47.40 |
| Luperox ® PMA-50 | 68.0 | 1.61 |
| Zelec ® UN (lubricant and release agent) | 8.5 | 0.19 |
| Demineralized water | 17.0 | 0.38 |
| Alumina trihydrate | 2125.0 | 18.84 (same particle size as in Example 2) |
| Calcined talc | 2125.0 | 17.84 (same particle size as in Example 2) |
| Wollastonite | 1105.0 | 8.19 (same particle size as in Example 2) |
| Opaque black acrylic particles (B-7) above | 426.0 | 5.31 |

D. About 17.0 g. (0.10 part by volume) of magnesium oxide powder was added to (C), mixed well and de-aerated by applying vacuum.

E. About 8.5 g. (0.14 part by volume) of ethylene glycol dimercaptoacetate was added to (D), mixed in rapidly and de-aerated by applying vacuum for one minute.

F. The pour viscosity of the mix was about 40 stokes; the initial settling velocity of particles of average size was about 0.06 cm./min. and that of particles of maximum size about 0.7 cm./min.

G. The wet mix was poured into the vacuum mold described in B-5, which had been modified to decrease the cavity depth to about ¼ inch.

H. The mix was covered with a film of humidified polyvinyl alcohol, rolled to press the mix firmly in the cavity, insulated with a glass wool blanket, and polymerized autogenically.

I. Five minutes after adding the ethylene glycol dimercaptoacetate, the mix had set to a solid mass with a viscosity estimated to be significantly higher than 1000 stokes.

J. After 60 minutes, the casting was removed, cooled at ambient room temperature, and stripped from the polyvinyl alcohol film giving a hard ¼-inch thick sheet which resembled natural gray granite.

K. The surface which had been face down in the mold cavity was uniform in pattern and particle distribution was uniform throughout the thickness of the sheet.

L. The whiteness index of the surface was 18.6 ± 0.9. The coefficient of variation was 4.8%.

M. IMANCO ® Quantimet 720 Surface Image Analysis:

|  | % Area (Accumulative) | Standard Deviation |
| --- | --- | --- |
| Detection Level 820 | 10.8 | ± 0.8 |
| Detection Level 860 | 21.7 | ± 0.8 |
| Detection Level 900 | 36.2 | ± 0.9 |
| Detection Level 950 | 56.8 | ± 0.7 |

N. A 0.05-inch thick wafer had an optical density to incident visible light less than 3.0.

EXAMPLE 19

Example 18 was repeated except for the following changes:

A. Parts by volume of ingredients:

|  | Parts by Volume |
| --- | --- |
| Sirup (A) in Example 18 | 47.40 |
| Luperox ® PMA-25 | 1.61 |
| Zelec ® UN | 0.19 |
| Demineralized water | 0.38 |
| Alumina trihydrate | 18.84 (particle size same as in Example 1) |
| Calcined talc | 17.84 (particle size same as in Example 1) |
| Wollastonite | 8.19 (particle size same as in Example 1) |
| Anthracite coal | 5.31 (min. part. size = 250 microns avg. = 580 microns max. = 1200 microns |
| Magnesium oxide | 0.10 |
| Ethylene glycol dimercapto-acetate | 0.14 |

B. The pour viscosity of the mix was about 40 stokes; the initial settling velocity of particles of average size was about 0.06 cm./min. and that of particles of maximum size about 0.7 cm./min.

C. Five minutes after adding the ethylene glycol dimercaptoacetate, the mix had set to a solid mass with a viscosity estimated to be significantly higher than 1000 stokes.

D. A hard, ¼-inch thick sheet was obtained which resembled natural granite.

E. The surface (pattern face down in the mold cavity) and particle distribution throughout the thickness of the sheet were uniform.

F. A 0.05-inch thick wafer had an optional density to indicent visible light less than 3.0.

EXAMPLE 20

Example 18 was repeated except for the following changes:

A. Parts by volume of ingredients:

|  | Parts by Volume | |
| --- | --- | --- |
| Sirup (A) in Example 18 | 47.40 | |
| Luperox ® PMA-25 | 1.61 | |
| Zelec ® UN | 0.19 | |
| Demineralized water | 0.38 | |
| Alumina trihydrate | 18.84 | (particle size same as in Example 1) |
| Calcined talc | 17.84 | (particle size same as in Example 1) |
| Wollastonite | 8.19 | (particle size same as in Example 1) |
| Goethite | 5.31 | (min. part. size = 200 microns avg. = 600 microns max. = 1200 microns |
| Magnesium oxide | 0.10 | |
| Ethylene glycol dimercapto-acetate | 0.14 | |

B. The pour viscosity of the mix was about 35 stokes; the initial settling velocity of particles of average size was about 0.08 cm./min. and that of particles of maximum size about 1.2 cm./min.

C. Five minutes after adding the ethylene glycol dimercaptoacetate, the mix had set to a solid mass with a viscosity estimated to be significantly higher than 1000 stokes.

D. A hard, ⅛-inch thick sheet was obtained which resembled natural granite.

E. The surface was uniform in pattern and particle distribution was uniform throughout the thickness of the sheet.

F. A 0.05-inch thick wafer had an optical density to incident visible light less than 3.0.

EXAMPLE 21

Example 2 was repeated except for the following changes:

A. Parts by volume of ingredients:

|  | Parts by Volume | |
| --- | --- | --- |
| Sirup (A) in Example 2 | 48.00 | |
| Azobisisobutyronitrile | 0.50 | |
| Zelec ® UN | 0.20 | |
| Aerosil ®380 (colloidal silica) | 1.00 | |
| Alumina trihydrate | 18.84 | (particle size same as in Example 1) |
| Drierite | 17.84 | (min. part. size = 250 microns avg. = 540 microns max. = 1200 microns) |
| Siderite | 5.31 | (min. part. size = 250 microns avg. = 560 microns max. = 1200 microns) |
| Wollastonite | 8.31 | (same particle size as in Example 1) |

B. The pour viscosity of the mix was about 50 stokes; the initial settling velocity of particles of average size was about 0.06 cm./min., and that of particles of maximum size about 0.9 cm./min.

C. The wet mix was poured into a 5½ inch × 8½ inch × 1 inch deep aluminum pan, placed in a vacuum oven at ambient room temperature and de-aerated slowly.

D. Nitrogen was used to replace air in the oven, and a nitrogen bleed was maintained while subjecting the casting to 110° C. polymerization and cure.

E. The pan was removed from the oven and cooled at ambient temperature.

F. A hard, ⅞-inch thick casting with a smooth surface where it contacted the aluminum was obtained that looked much like natural granite.

G. The surface was uniform in pattern and particle distribution was uniform throughout the thickness of the sheet.

H. A 0.05-inch thick wafer had an optical density to incident visible light less than 3.0.

EXAMPLE 22

Example 2 was repeated except for the following changes:

A. Parts by volume of ingredients:

|  | Parts by volume | |
| --- | --- | --- |
| Sirup (A) in Example 2 | 47.40 | |
| Luperox ® PMA-25 | 1.61 | |
| Zelec ® UN | 0.19 | |
| Demineralized water | 0.38 | |
| Alumina trihydrate | 18.84 | (particle size same as in Example 1) |
| Calcined talc | 17.84 | (particle size same as in Example 1) |
| Hawaiian black sand | 5.31 | (min. part. size = 250 microns avg. = 580 microns max. = 1200 microns) |
| Wollastonite | 8.19 | (particle size same as in Example 1) |
| Magnesium oxide | 0.10 | |
| Ethylene glycol dimercapto-acetate | 0.14 | |

B. The pour viscosity of the mix was about 30 stokes; the initial settling velocity of particles of average size was about 0.09 cm./min., and that of particles of maximum size was about 1.0 cm./min.

C. Five minutes after adding the ethylene glycol dimercaptoacetate, the mix had set to a solid mass with a viscosity estimated to be significantly higher than 1000 stokes.

D. A hard, ⅛-inch thick casting was obtained which resembled natural granite.

E. The surface was uniform in pattern and particle distribution was uniform throughout the thickness of the casting.

F. A 0.05-inch thick wafer had an optical density to incident visible light less than 3.0.

EXAMPLE 23

A. About 1500 g. of a wet mix was prepared essentially by the procedure used in Example 2.

B. Parts by volume of ingredients:

|  | Parts by Volume | |
| --- | --- | --- |
| Sirup (A) in Example 2 | 50.80 | |
| Luperox ® PMA-25 | 1.42 | |
| Zelec ® UN | 0.18 | |
| Demineralized water | 0.36 | |
| Alumina trihydrate | 14.90 | (same particle size as in Example 1) |
| Calcined talc | 14.22 | (same particle size as in Example 1) |
| Quartz chips | 14.12 | (min. part. size = 800 microns avg. = 1100 microns max. = 2400 microns) |
| Filled black phenolic resin | 1.54 | (min. part. size = 250 microns avg. = 580 microns |

-continued

|  | Parts by Volume |
| --- | --- |
| Black rayon flock | 2.22 (max. = 1200 microns)<br>(3dpf; 0.1 cm staple) |
| Magnesium oxide | 0.10 |
| Ethylene glycol dimercapto-acetate | 0.14 |

C. The pour viscosity of the mix was about 120 stokes; the initial settling velocity of particles of average size was about 0.004 cm./min., and that of particles of maximum size was about 0.9 cm./min.

D. A tempered glass plate was placed on a glass wool blanket and a ¼-inch thick by ½-inch wide rubber gasket was placed around its perimeter. The wet mix was poured onto the plate and spread so that it filled the entire ¼-inch thick cavity. A second glass plate was placed over the mix and pressed firmly down on the mix until the top plate was flush with the gasket, sealing the mix within the created cell. The two glass plates were then clipped firmly all around the perimeter so that both were held tightly on the gasket. A glass wool blanket was placed over the top of the assembly and the mix was allowed to polymerize autogenically.

E. Five minutes after adding the ethylene glycol dimercaptoacetate, the mix had to set to a non-flowable mass with a viscosity estimated to be significantly higher than 1000 stokes.

F. After polymerization was complete, the glass wool blanket was removed and the assembly was allowed to cool at ambient room temperature. The casting was then removed.

G. A casting with a glossy, smooth surface was obtained which was uniform in surface pattern and particle distribution throughout its thickness. It resembled polished natural black granite.

H. A 0.05-inch thick wafer possessed an optical density to incident visible light less than 3.0.

EXAMPLE 24

Example 23 was repeated except for the following differences:

A. Parts by volume of ingredients:

|  | Parts by Volume |
| --- | --- |
| Sirup (A) in Example 2 | 50.00 |
| Lauroyl peroxide | 1.50 |
| Zelec ® UN | 0.20 |
| Demineralized water | 0.40 |
| Alumina trihydrate | 15.00 (same particle size as in Example 1) |
| Calcined talc | 14.00 (same particle size as in Example 1) |
| Degreased iron filings | 2.50 (min. part. size = 250 microns<br>avg. = 410 microns<br>max. = 800 microns) |
| Wollastonite | 8.15 (same particle size as in Example 1) |
| Quartz chips | 8.00 (same particle size as in Example 23) |
| Zinc oxide | 1.00 |
| n-Dodecyl mercaptan | 0.15 |

B. The pour viscosity of the mix was about 25 stokes, the initial settling viscosity of particles of average size was about 0.1 cm./min. and that of particles of maximum size about 3 cm./min.

C. The assembly was placed in an oven at 100° C. for one hour and removed and cooled at ambient room temperature.

D. A casting with a glossy, smooth surface was obtained which was uniform in surface pattern and resembled polished natural gray granite.

E. A 0.05-inch thick wafer had an optical density to incident visible light less than 3.0.

EXAMPLE 25

Example 23 was repeated except for the following differences:

A. White opaque particles were made by a process essentially the same as described in Example 18-B.

(1) Parts by weight of ingredients:

|  | Parts by Weight |
| --- | --- |
| Sirup (A) in Example 2 | 27.00 |
| Ethylene dimethacrylate | 3.00 |
| Luperox ® PMA-25 | 0.80 |
| Alumina trihydrate | 53.70 (same particle size as in Example 1) |
| Titanium dioxide pigment | 15.00 (avg. particle size = <1 micron) |
| Demineralized water | 0.20 |
| Magnesium oxide | 0.20 |
| Ethylene glycol dimercapto-acetate | 0.10 |

(2) The casting was broken up, crushed and sieved. The sieved fractions were mixed to give a particle size distribution of: minimum particle size = 250 microns; average particle size = 580 microns; and maximum particle size = 1200 microns.

B. The parts by volume of ingredients for the castable composition were:

|  | Parts by Volume |
| --- | --- |
| Sirup (A) in Example 2 | 47.40 |
| Luperox ® PMA-25 | 1.60 |
| Zelec ® UN | 0.20 |
| Demineralized water | 0.40 |
| Alumina trihydrate | 20.82 (same particle size as in Example 1) |
| White acrylic particles prepared in (A) | 17.84 |
| Black polypropylene particles | 5.31 (same particle size as in Example 2) |
| Calcite | 6.19 (min. = 800 microns<br>avg. = 1100 microns<br>max. = 2400 microns) |
| Magnesium oxide | 0.10 |
| Ethylene glycol dimercaptoacetate | 0.14 |

C. The pour viscosity of the mix was about 60 stokes; the initial settling velocity of particles of average size was about 0.03 vm./min. and that of particles of maximum size about 2 cm./min.

D. A casting with a glossy, smooth surface was obtained which was uniform in surface pattern and resembled polished natural gray granite.

E. A 0.05-inch thick wafer had an optical density to incident visible light less than 3.0.

EXAMPLE 26

Example 23 was repeated except for the following changes:

A. Parts by volume of ingredients:

|  | Parts by Volume |
| --- | --- |
| Sirup (A) in Example 2 | 51.40 |
| Luperox ® PMA-25 | 1.44 |
| Zelec ® UN | 0.17 |
| Demineralized water | 0.42 |
| Alumina trihydrate | 13.52 (same particle size as in Example 1) |

-continued

|  | Parts by Volume |  |
|---|---|---|
| Monastral green pigment | 1.18 |  |
| Green glass chips | 17.75 | (min. = 0.1 cm. |
|  |  | avg. = 0.3 cm. |
|  |  | max. = 0.8 cm.) |
| Pyrex ® glass chips | 13.49 | (min. = 0.01 cm. |
|  |  | avg. = 0.3 cm. |
|  |  | max. = 0.5 cm.) |
| Brass shavings | 0.40 | (min. = 0.001 cm. |
|  |  | avg. = 0.1 cm. |
|  |  | max. = 0.3 cm.) |
| Magnesium oxide | 0.10 |  |
| Ethylene glycol dimercapto-acetate | 0.14 |  |

B. The pour viscosity of the mix was about 20 stokes; the initial settling velocity of particles of average size was about 6 cm./min. and that of particles of maximum size about 60 cm./min.

C. A casting with a glossy, smooth surface was obtained which was uniform in surface pattern.

D. A 0.05-inch thick wafer had an optical density to incident visible light less than 3.0.

EXAMPLE 27

Example 23 was repeated except for the following changes:

A. Parts by volume of ingredients:

|  | Parts by Volume |  |
|---|---|---|
| Sirup (A) in Example 2 | 47.40 |  |
| t-butylperoxypivalate | 1.60 |  |
| Zelec ® UN | 0.20 |  |
| Demineralized water | 0.40 |  |
| Alumina trihydrate | 16.16 | (same particle size as in Example 1) |
| Red rayon flock | 0.50 | (3 dpf; 0.1 cm. in length) |
| Unbleached paper pulp (Brown Paper Co.) | 1.00 |  |
| Flint quartz | 16.00 | (min. = 0.5 cm. |
|  |  | avg. = 0.8 cm. |
|  |  | max. = 1.0 cm.) |
| Quartz chips | 16.00 | (min. = 800 microns |
|  |  | avg. = 1100 microns |
|  |  | max. = 2400 microns) |
| Mica flakes | 0.50 |  |
| Calcium oxide | 0.10 |  |
| Pentaerythritol tetra-thioglycolate | 0.14 |  |

B. The pour viscosity of the mix was about 50 stokes; the initial settling viscosity of particles of average size was about 0.02 cm./min. and that of particles of maximum size about 30 cm./min.

C. A ¼-inch thick casting was obtained which resembled pink polished granite. The surface was uniform and a 0.05-inch thick wafer had an optical density to incident visible light less than 3.0.

What is claimed is:

1. A simulated granite article comprising:
   A. about 35 to 95% by volume (based on total granite volume) of a matrix comprising:
      (1) at least 34% by volume (based on total granite volume) of polymer having a refractive index $(n_D)$ according to ASTM-(D542)27 between 1.4 and 1.65, and
      (2) about 1 to 50% by volume (based on total granite volume) of filler having a maximum particle size less than about 100 microns in the longest dimension and an amorphous or mean crystalline axial refractive index $(n_D)$ between 1.4 and 1.65; in such a ratio of (1) to (2) that the optical density to visible light (4000–8000 Angstroms) of a 0.01 inch thick film of the matrix is less than 1.5;
   B. about 0.1 to 50% by volume (based on total granite volume) of randomly distributed opaque particles having a minimum particle size greater than 200 microns in shortest dimension and an optical density to visible light (4000–8000 Angstroms) greater than 2.0; and
   C. about 0.1 to 50% by volume (based on total granite volume) of randomly distributed translucent particles, transparent particles or both having a minimum particle size greater than 200 microns in shortest dimension, and an optical density to visible light (4000–8000 Angstroms) less than 2.0; in such a ratio of (A) to (B) to (C) that the optical density to visible light (4000–8000 Angstroms) of a 0.05-inch thick wafer of the article is less than 3.0.

2. The simulated granite of claim 1 wherein the polymer is an acrylic polymer.

3. The simulated granite of claim 2 wherein the polymer has an optical density to visible light (4000–8000 Angstroms) less than 0.2, a hardness when cured greater than 5 knoop and a volatile constituent content less than 1% by weight (based on total granite weight).

4. The simulated granite of claim 3 wherein the polymer is about 40–60% and the filler about 5–40% of the volume of the total granite article.

5. The simulated granite of claim 4 wherein the filler is at least one of alumina trihydrate, powdered talc, fine silica, powdered glass, colloidal asbestos, calcium sulfate, calcium carbonate, Kaolin or bentonite.

6. The simulated granite of claim 5 wherein the filler has a maximum particle size less than about 70 microns in longest dimension.

7. The simulated granite of claim 5 wherein the polymer has an optical density less than 0.1, a hardness when cured greater than 15 knoop and a volatile constituent less than 1% by weight, and the ratio of polymer to filler is such that the optical density to visible light (4000–8000 Angstroms) of a 0.010-inch thick film of the matrix is less than 1.0.

8. The simulated granite of claim 5 wherein the minimum, average and maximum particle size dimension of opaque, translucent and transparent particles is between 250 and 5000 microns.

9. The simulated granite of claim 8 wherein the opaque particles are at least one of calcined talc, magnetite, siderite, ilmenite, goethite, galena, coal, pyrite, hematite, limonite, natural granite, biotite, anhydrite, chalk, sandstone, peat and various filled or pigmented polymers such as polypropylene, crosslinked acrylic polymers, polyethylene, ethylene copolymers, phenolic resins, urea/formaldehyde resins, crosslinked polyvinylchloride and polyesters.

10. The simulated granite of claim 9 wherein the optical density to visible light (4000–8000 Angstroms) of translucent and transparent particles is less than 1.5.

11. The simulated granite of claim 10 wherein the translucent and transparent particles are at least one of calcite, feldspar, glass, marble, mica, obsidian, quartz, silica, wollastonite and various filled or unfilled, pigmented or dyed, insoluble chips of polymeric materials such as cellulose, polyethylene, ethylene copolymers, crosslinked polyacrylics, polyesters, polypropylenes, crosslinked polyvinylchlorides and polyacetals.

12. The simulated granite of claim 11 in the form of a sheet about 1/16 inch – 2 inches in thickness.

13. The simulated granite of claim 11 wherein the matrix (A) is about 45 to 90% by volume, the opaque particles (B) are about 1 to 35% by volume and the translucent particles, transparent particles or both (C) are about 1 to 35% by volume (all based on total volume of granite).

14. The simulated granite of claim 11 wherein the matrix (A) is about 45 to 80% by volume, the opaque particles (B) are about 5 to 25% by volume, and the transparent particles, translucent particles or both (C) are about 5 to 30% by volume (all based on total volume of granite).

15. A simulated granite article comprising:
   A. about 45 to 80% by volume (based on total granite volume) of a matrix comprising:
      (1) about 40–60% by volume (based on total granite volume) of a polymer which is predominantly poly(methyl methacrylate); and
      (2) about 5–40% by volume (based on total granite volume) of alumina trihydrate particles having a maximum particle size in the longest dimension less than about 70 microns;
   B. about 5–25% by volume (based on total granite volume) of opaque particles having minimum, average and maximum particle sizes within the range of about 250–5000 microns and an optical density to visible light (4000–8000 Angstroms) greater than 2; and
   C. about 5–30% by volume (based on total granite volume) of transparent particles, translucent particles or both having minimum, average and maximum particle sizes within the range of about 250–5000 microns, and an optical density to visible light (4000–8000 Angstroms) less than 1.5; in such a ratio of (A) to (B) to (C) that the optical density to visible light (4000–8000 Angstroms) of a 0.05-inch thick wafer of the article is less than 2.5.

16. The simulated granite of claim 15 wherein the opaque particles are at least one of calcined talc, magnetite, siderite, ilmenite, goethite, galena, coal, pyrite, hematite, limonite, natural granite, biotite, anhydrite, chalk, sandstone, peat and various filled or pigmented polymers such as polypropylene, crosslinked acrylic polymers, polyethylene, ethylene copolymers, phenolic resins, urea/formaldehyde resins, crosslinked polyvinylchloride and polyesters.

17. The simulated granite of claim 16 wherein the article has a surface pattern comprising about 1–40% in area detectable at densitometric level 820, about 1–20% additional area detectable at level 860, about 1–20% additional area detectable at level 900, about 1–20% additional area detectable at level 950 and about 40–60% additional area detectable at a level above 950 as determined by IMANCO ® Quantimet 720 image analysis.

18. The simulated granite of claim 15 wherein the translucent and transparent particles are at least one of calcite, feldspar, glass, marble, mica, obsidian, quartz, silica, wollastonite and various filled or unfilled, pigmented or dyed, insoluble chips of polymeric materials such as cellulose, polyethylene, ethylene copolymers, crosslinked polyacrylics, polyesters, polypropylenes, crosslinked polyvinylchlorides and polyacetals.

19. The simulated granite of claim 16 wherein the translucent and transparent particles are at least one of calcite, feldspar, glass, marble, mica, obsidian, quartz, silica, wollastonite and various filled or unfilled, pigmented or dyed, insoluble chips of polymeric materials such as cellulose, polyethylene, ethylene copolymers, crosslinked polyacrylics, polyesters, polypropylenes, crosslinked polyvinylchlorides and polyacetals.

20. The simulated granite of claim 16 in the form of a flat sheet about 1/16 inch – 2 inches in thickness.

21. The simulated granite of claim 19 additionally containing up to about 10% by volume of decorative particles, said decorative particles being at least one of pigments, dyes, metallic flakes, colored fiber flocks and colored chopped fibers.

22. A castable composition comprising:
   A. a polymerizable matrix, which when polymerized will make up 35 to 95% by volume of a simulated granite article and consisting essentially of:
      (1) polymerizable sirup, which when polymerized will make up at least 34% by volume of the simulated granite article, comprising:
         (a) a polymerizable constituent, which when polymerized will make up at least 30% by volume of the simulated granite article and
         (b) a polymeric viscosity control constituent which will make up about 0–20% by volume of the simulated granite article, said sirup when polymerized having a refractive index ($n_D$) between about 1.4 and 1.65;
      (2) an initiator system for the polymerizable constituent;
      (3) a filler, which will make up about 1 to 50% by volume of the simulated granite article, having a maximum particle size less than about 100 microns in longest dimension and an amorphous or mean crystalline axial refractive index ($n_D$) between about 1.4 and 1.65, in such a ratio of (1) to (2) to (3) that the optical density to visible light (4000–8000 Angstroms) of a 0.01-inch thick film of polymerized matrix is less than 1.5;
   B. opaque particles, making up about 0.1 to 50% by volume of the simulated granite article, having a minimum particle size greater than 200 microns in shortest dimension and an optical density to visible light (4000–8000 Angstroms) greater than 2.0;
   C. transparent particles, translucent particles or both making up about 0.1 to 50% by volume of the simulated granite article, having a minimum particle size greater than 200 microns in shortest dimension, and an optical density to visible light (4000–8000 Angstroms) less than 2.0; said composition having a kinematic viscosity no greater than 1000 stokes, as determined by ASTM D 1545, a minimum viscosity such that the initial settling velocity of the largest and heaviest particle in the composition is less than 100 cm./min. and a ratio of (A) to (B) to (C) such that the optical density to visible light (4000–8000 Angstroms) of a 0.05-inch thick wafer of finished granite article is less than 3.0.

23. The composition of claim 22 wherein the polymerizable constituent is predominantly a polymerizable acrylic monomer having in the polymerized state, an optical density to visible light (4000–8000 Angstroms) less than 0.2 and a hardness greater than 5 knoop.

24. The composition of claim 23 wherein the polymeric viscosity control constituent is predominantly an acrylic polymer, a copolymer of vinyl chloride and vinylidene chloride or cellulose acetate butyrate having an optical density to visible light (4000–8000 Angstroms) less than 0.2 and a hardness greater than 5 knoop.

25. The composition of claim 24 wherein the initiator system for the polymerizable constituent is 0.1 to 2% by weight (based on polymerizable constituent) of a peroxy compound, 0.05 to 5.0% by weight (based on polymerizable constituent) of water, an equivalent weight of basic compound (based on peroxy compound) having a pK$_b$ less than 6.0 in water at 25° C.

26. The composition of claim 25 wherein the peroxy compound is at least one of hydrogen peroxide, lauroyl peroxide, t-butylperoxypivalate and t-butyl peroxymaleic acid; the basic compound is at least one of calcium oxide, calcium hydroxide, magnesium oxide, magnesium hydroxide or zinc oxide.

27. The composition of claim 24 wherein the initiator system is 0.01 to 2% by weight (based on polymerizable constituent) of an azo compound and is at least one of 2,2'-azo-bisisobutyronitrile; 2,2'-azo-bis-[alpha,gamma-dimethylvaleronitrile]; 4-t-butylazo-4-cyanovaleric acid or 4,4'-azobis-[4-cyanovaleric acid].

28. The composition of claim 26 wherein about 0.01 to 2% (based on weight of polymerizable constituent) of a polymerization accelerator is added and is at least one of n-dodecyl mercaptan, octadecyl mercaptan, 2-mercaptoethanol, ethylene glycol dimercaptoacetate, trimethylol propane trithioglycolate, and pentaerythritol tetrathioglycolate.

29. The composition of claim 28 wherein the filler is at least one of powdered talc, fine silica, powdered glass, colloidal asbestos, calcium sulfate, calcium carbonate, kaolin, bentonite and alumina trihydrate and has a maximum particle size less than 70 microns in longest dimension.

30. The composition of claim 29 wherein the ratio of sirup to filler is such that the optical density to visible light (4000–8000 Angstroms) of a 0.01-inch thick polymerized film of matrix is less than 1.0.

31. The composition of claim 30 wherein the opaque particles have a minimum, average and maximum particle size in the range of about 250–5000 microns and are at least one of calcined talc, magnetite, siderite, ilmenite, goethite, galena, coal, pyrite, hematite, limonite, biotite, natural granite, anhydrite, chalk, sandstone, peat and various filled or pigmented insoluble polymers such as polypropylene, crosslinked acrylic polymers, polyethylene, ethylene copolymers, phenolic resins, urea/formaldehyde resins, crosslinked polyvinyl chloride and polyesters.

32. The composition of claim 30 wherein the translucent and transparent particles have a minimum, average and maximum particle size in the range of about 250–5000 microns and an optical density to visible light (4000–8000 Angstroms) less than 1.5 and are at least one of calcite, feldspar, glass, marble, mica, obsidian, quartz, sand, silica, wollastonite and various filled or unfilled, pigmented or dyed insoluble chips of polymeric materials such as cellulose, polyethylene, ethylene copolymers, crosslinked polyacrylics, polyesters, polypropylenes, crosslinked polyvinyl chlorides and polyacetals.

33. The composition of claim 31 wherein the translucent and transparent particles have a minimum, average and maximum particle size in the range of about 250–5000 microns and an optical density to visible light (4000–8000 Angstroms) less than 1.5 and are at least one of calcite, feldspar, glass, marble, mica, obsidian, quartz, sand, silica, wollastonite and various filled or unfilled, pigmented or dyed insoluble chips of polymeric materials such as cellulose, polyethylene, ethylene copolymers, crosslinked polyacrylics, polyesters, polypropylenes, crosslinked polyvinyl chlorides and polyacetals.

34. The composition of claim 33 wherein the matrix (A) is sufficient to comprise about 45–90% by volume, the opaque particles (B) about 1–35% by volume and the translucent particles, transparent particles or both (C) about 1–35% by volume of the finished simulated granite article.

35. The composition of claim 34 wherein the maximum viscosity is no greater than 500 stokes and the initial settling velocity of the largest and heaviest particle is less than 10 cm./min.

36. A castable composition comprising:
A. a matrix which, when polymerized, will make up about 45–80% by volume of a simulated granite article and consisting essentially of:
   (1) a sirup of predominantly poly(methyl methacrylate) dissolved in methyl methacrylate monomer which, when polymerized, will make up about 40–60% by volume of the article;
   (2) an initiator system for the sirup; and
   (3) about 5–40% by volume (based on the article volume) of alumina trihydrate particles having a maximum particle size in longest dimension less than about 70 microns; in such a ratio of (1) to (2) to (3) that the optical density to visible light (4000–8000 Angstroms) of a 0.01-inch thick film of polymerized matrix is less than 1.0;
B. opaque particles, making up about 5–25% by volume of the simulated granite article, having a minimum, average and maximum particle size within the range 250–5000 microns and having an optical density to visible light (4000–8000 Angstroms) greater than 2.0;
C. translucent particles, transparent particles or both, making up about 5 – 30% by volume of the simulated granite article, having a minimum, average and maximum particle size within the range 250–5000 microns, and an optical density to visible light (4000–8000 Angstroms) less than 1.5; said composition having a maximum viscosity no greater than 200 stokes as determined by ASTM D 1545; a minimum viscosity such that the initial settling velocity of the largest and heaviest particles in the composition is less than 2 cm./min.; and a ratio of (A) to (B) to (C) such that the optical density to visible light (4000–8000 Angstroms) of a 0.05-inch thick wafer of the resulting simulated granite article is less than 2.5.

37. The composition of claim 36 wherein the castable composition contains up to about 10% by volume (based on final granite volume) of additional decorative particles, said decorative particles being at least one of pigments, dyes, metallic flakes, colored fiber flocks and chopped fibers.

38. The composition of claim 37 wherein the cured granite article is a flat sheet about 1/16 inch to 2 inches in thickness.

39. The composition of claim 37 wherein the opaque particles are at least one of calcined talc, magnetite, siderite, ilmenite, goethite, galena, coal, pyrite, hematite, limonite, biotite, natural granite, anhydrite, chalk, sandstone, peat and various filled or pigmented insoluble polymers such as polypropylene, crosslinked acrylic polymers, polyethylene, ethylene copolymers, phenolic resins, urea/formaldehyde resins, crosslinked polyvinyl chloride and polyesters and the translucent and transparent particles are at least one of calcite, feldspar, glass, marble, mica, obsidian, quartz, sand, silica, wollastonite and various filled or unfilled, pigmented or dyed insoluble chips of polymeric materials such as cellulose, polyethylene, ethylene copolymers, crosslinked polyacrylics, polyesters, polypropylenes, crosslinked polyvinyl chlorides and polyacetals.

* * * * *